United States Patent
Ye et al.

(10) Patent No.: US 11,246,122 B2
(45) Date of Patent: Feb. 8, 2022

(54) DEVICE AND METHOD FOR HANDLING BANDWIDTH PARTS

(71) Applicant: HTC Corporation, Taoyuan (TW)

(72) Inventors: Shiang-Rung Ye, Taoyuan (TW); Chih-Hsiang Wu, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 16/242,001

(22) Filed: Jan. 8, 2019

(65) Prior Publication Data

US 2019/0215808 A1  Jul. 11, 2019

Related U.S. Application Data

(60) Provisional application No. 62/615,976, filed on Jan. 11, 2018.

(51) Int. Cl.
*H04W 72/04* (2009.01)
*H04L 29/12* (2006.01)
*H04L 12/24* (2006.01)
*H04L 5/00* (2006.01)

(52) U.S. Cl.
CPC .......... *H04W 72/042* (2013.01); *H04L 5/001* (2013.01); *H04L 5/0053* (2013.01); *H04L 5/0098* (2013.01); *H04L 41/0896* (2013.01); *H04L 61/6022* (2013.01)

(58) Field of Classification Search
CPC ... H04L 5/0098; H04L 41/0896; H04L 5/001; H04L 5/0053; H04L 61/6022; H04W 72/042
See application file for complete search history.

(56) References Cited

U.S. PATENT DOCUMENTS

| 2019/0149421 A1* | 5/2019 | Jin | H04W 72/042 |
| | | | 370/331 |
| 2019/0208548 A1* | 7/2019 | Shih | H04L 5/0051 |
| 2019/0215136 A1* | 7/2019 | Zhou | H04B 17/24 |
| 2019/0289513 A1* | 9/2019 | Jeon | H04W 52/40 |
| 2020/0337051 A1* | 10/2020 | Chang | H04W 72/0453 |

OTHER PUBLICATIONS

Abinader et al,. "mpact of Bandwidth Part (BWP) Switching on 5G NR System Performance", IEEE 2019 (Year: 2019).*
Search Report dated May 20, 2019 for EP application No. 19151196.3, pp. 1-6.

(Continued)

*Primary Examiner* — Omer S Mian
(74) *Attorney, Agent, or Firm* — Winston Hsu

(57) ABSTRACT

A method for handling BWPs utilized in a communication device comprises receiving a first MAC CE for activating at least one first SCell, from a network; activating the at least one first SCell; starting a sCellDeactivationTimer associated with the at least one first SCell, when activating the at least one first SCell; deactivating the at least one first SCell, if a second MAC CE for deactivating the at least one first SCell is received from the network, or if the sCellDeactivationTimer expires; stopping the sCellDeactivationTimer, when deactivating the at least one first SCell; and stopping a first BWP-InactivityTimer for the at least one first SCell, when deactivating the at least one first SCell.

6 Claims, 3 Drawing Sheets

(56) References Cited

OTHER PUBLICATIONS

HTC, "BWP inactivity timer setting on SCell deactivation", 3GPP TSG-RAN2 WG2 #AH-1801, R2-1801418, Jan. 22-26, 2018, Vancouver, Canada, XP051386827, pp. 1-3.

3GPP TS 38.304 v0.0.6 (Nov. 2017); Technical Specification; 3rd Generation Partnership Project; Technical Specification Group Radio Access Network; New Generation Radio Access Network; User Equipment (UE) procedures in Idle mode (Release 15).

3GPP TR 38.913 V14.3.0 (Jun. 2017); Technical Report; 3rd Generation Partnership Project; Technical Specification Group Radio Access Network; Study on Scenarios and Requirements for Next Generation Access Technologies; (Release 14).

3GPP TR 22.862 V14.1.0 (Sep. 2016); Technical Report; 3rd Generation Partnership Project; Technical Specification Group Services and System Aspects; Feasibility Study on New Services and Markets Technology Enablers for Critical Communications; Stage 1 (Release 14).

3GPP TS 36.321 V14.5.0 (Dec. 2017); Technical Specification; 3rd Generation Partnership Project; Technical Specification Group Radio Access Network; Evolved Universal Terrestrial Radio Access (E-UTRA); Medium Access Control (MAC) protocol specification (Release 14).

Office action dated Feb. 27, 2020 for EP application No. 19151196.3, pp. 1-8.

ASUSTeK, "Details of BWP inactivity timer", 3GPP TSG-RAN WG2 Meeting #100, R2-1712212, Nov. 27-Dec. 1, 2017, Reno, USA, XP051370919, pp. 1-5.

LG Electronics Inc., "TP for BWP", 3GPP TSG-RAN WG2 Meeting #100, Draft R2-1714046, Nov. 27-Dec. 1, 2017, Reno, USA, XP051372722, pp. 1-5.

3GPP TS 36.321 V15.0.0 (Dec. 2017), "3rd Generation Partnership Project; Technical Specification Group Radio Access Network; Evolved Universal Terrestrial Radio Access (E-UTRA); Medium Access Control (MAC) protocol specification (Release 15)", XP051392409, pp. 1-109.

3GPP TS 36.321 V14.4.0 (Sep. 2017), "3rd Generation Partnership Project; Technical Specification Group Radio Access Network; Evolved Universal Terrestrial Radio Access (E-UTRA); Medium Access Control (MAC) protocol specification (Release 14)", XP051337312, pp. 1-108.

* cited by examiner

DEVICE AND METHOD FOR HANDLING BANDWIDTH PARTS

CROSS REFERENCE TO RELATED APPLICATIONS

This application claims the benefits of U.S. Provisional Applications No. 62/615,976 filed on Jan. 11, 2018, which is incorporated herein by reference.

BACKGROUND OF THE INVENTION

1. Field of the Invention

The present invention relates to a device and a method used in a wireless communication system, and more particularly, to a device and a method of handling bandwidth parts (BWPs) in a wireless communication system.

2. Description of the Prior Art

In a new radio (NR) system, when a secondary cell (SCell) is deactivated, the BWP-InactivityTimer is not stopped, which results a bandwidth part (BWP) switching when the SCell is deactivated. On the other hand, when a SCell is activated, the BWP-InactivityTimer is not started and the medium access control (MAC) is not allowed to switch the BWP autonomously.

SUMMARY OF THE INVENTION

The present invention therefore provides a communication device for handling the BWPs to solve the abovementioned problem.

A communication device for handling BWPs comprises at least one storage device for storing instructions and at least one processing circuit coupled to the at least one storage device. The at least one processing circuit is configured to execute the instructions stored in the at least one storage device. The instructions comprise receiving a first MAC control element (CE) (MAC CE) for activating at least one first SCell, from a network; activating the at least one first SCell; starting a sCellDeactivationTimer associated with the at least one first SCell, when activating the at least one first SCell; deactivating the at least one first SCell, if a second MAC CE for deactivating the at least one first SCell is received from the network, or if the sCellDeactivationTimer expires; stopping the sCellDeactivationTimer, when deactivating the at least one first SCell; and stopping a first BWP-InactivityTimer for the at least one first SCell, when deactivating the at least one first SCell.

A method for handling BWPs utilized in a communication device comprises receiving a first MAC CE for activating at least one first SCell, from a network; activating the at least one first SCell; starting a sCellDeactivationTimer associated with the at least one first SCell, when activating the at least one first SCell; deactivating the at least one first SCell, if a second MAC CE for deactivating the at least one first SCell is received from the network, or if the sCellDeactivationTimer expires; stopping the sCellDeactivationTimer, when deactivating the at least one first SCell; and stopping a first BWP-InactivityTimer for the at least one first SCell, when deactivating the at least one first SCell.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
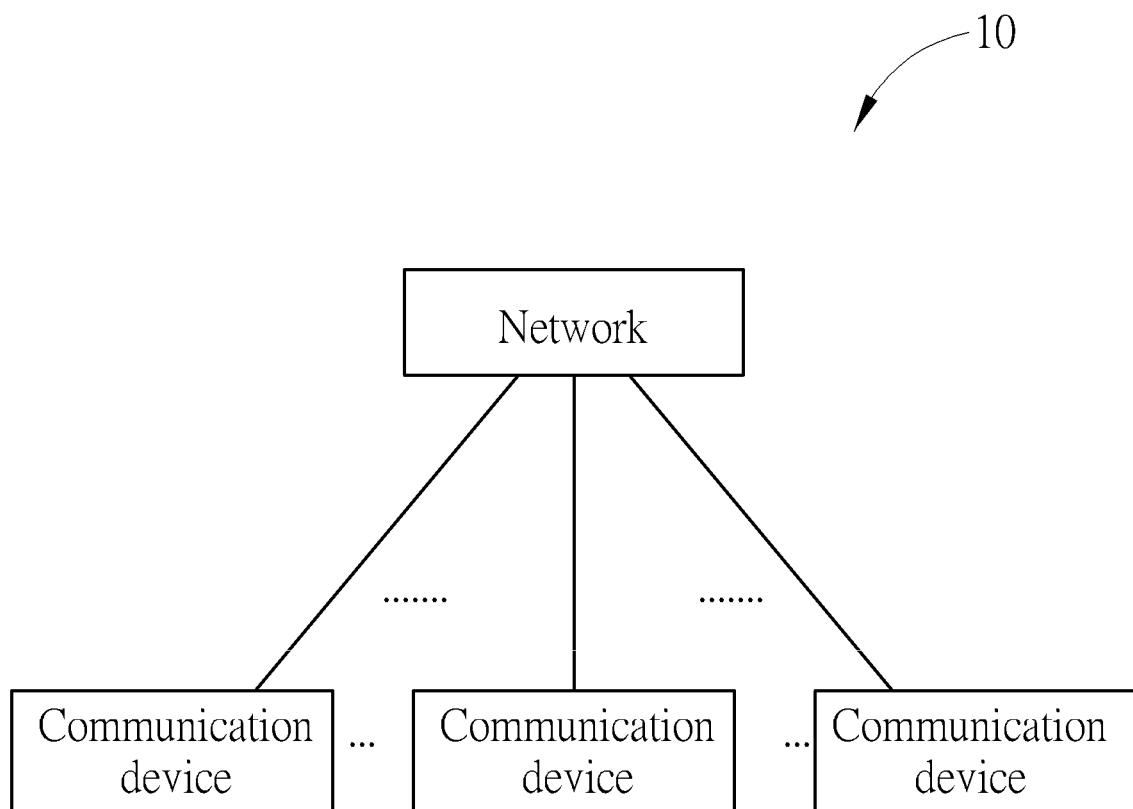
FIG. 1 is a schematic diagram of a wireless communication system according to an example of the present invention.

In FIG. 1, a network and communication devices are simply utilized for illustrating the structure of a wireless communication system 10. Practically, the network includes at least one of a long-term evolution (LTE) network, an evolved LTE network, a new radio (NR) network and a sixth generation (6G) network. The 6G radio communication technology may employ orthogonal frequency-division multiplexing (OFDM) or non-OFDM, a wider bandwidth (e.g., 1 GHz, 2 GHz or 5 GHz) and a transmission time interval (TTI) shorter than 1 ms (e.g., 1, 2, 3 or 4 OFDM symbols, or 100 or 200 us) for communication between the communication devices and a 6G base station (BS).

A communication device may be a user equipment (UE), a mobile phone, a laptop, a tablet computer, an electronic book, a portable computer system, a vehicle, or an aircraft. In addition, the network and the communication device can be seen as a transmitter or a receiver according to direction of transmission (i.e., transmission direction), e.g., for an uplink (UL), the communication device is the transmitter and the network is the receiver, and for a downlink (DL), the network is the transmitter and the communication device is the receiver.

Figure 2:
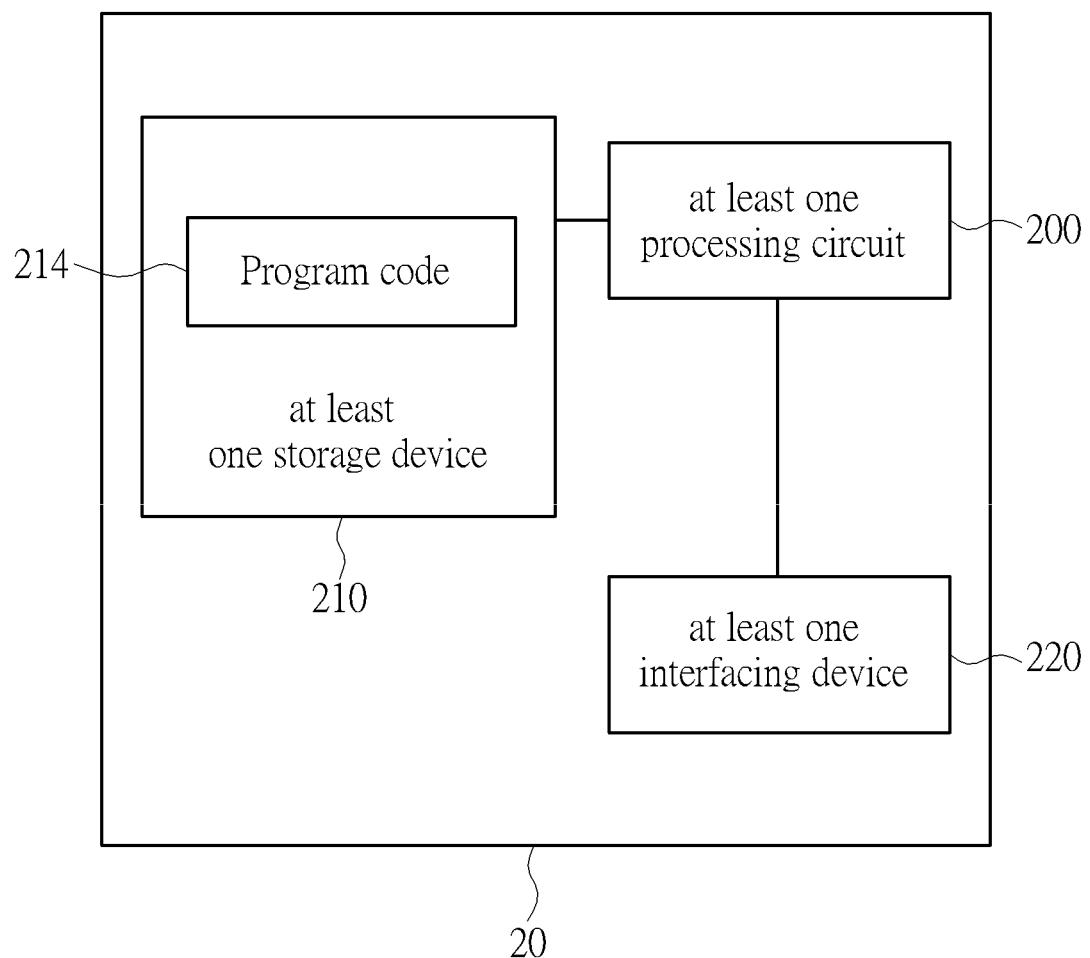
FIG. 2 is a schematic diagram of a communication device according to an example of the present invention.

In FIG. 2, a communication device 20 may be a communication device or the network shown in FIG. 1, but is not limited herein. The communication device 20 may include at least one processing circuit 200 of which each may be a microprocessor or Application Specific Integrated Circuit (ASIC), at least one storage device 210 and at least one communication interfacing device 220. The at least one storage device 210 may be any data storage device that may store program codes 214 accessed and executed by the at least one processing circuit 200. Examples of the at least one storage device 210 include but are not limited to a subscriber identity module (SIM), read-only memory (ROM), flash memory, random-access memory (RAM), hard disk, optical data storage device, non-volatile storage device, non-transitory computer-readable medium (e.g., tangible media), etc. The at least one communication interfacing device 220 includes at least one transceiver used to transmit and receive signals (e.g., data, messages and/or packets) according to processing results of the at least one processing circuit 200.

A serving cell may be configured with at most four bandwidth parts (BWPs). An active BWP is configured for an activated serving cell. A BWP switching for a serving cell is used to activate an inactive BWP and to deactivate an active BWP at a time. The BWP switching is controlled by a physical DL control channel (PDCCH) indicating a DL assignment or an UL grant. When a secondary cell (SCell) is activated, one BWP is initially active without receiving the PDCCH indicating a DL assignment and an UL grant.

For an unpaired spectrum, a DL BWP is paired with an UL BWP. The BWP switching is available for both the UL and the DL.

If a PDCCH for the BWP switching is received while a random access (RA) procedure is ongoing in a medium access control (MAC) entity, the UE determines whether to perform the BWP switching or to ignore the PDCCH for the BWP switching. If the UE determines to perform the BWP switching, the UE stops the ongoing RA procedure and initiates another RA procedure on a new activated BWP. On the other hand, if the UE determines to ignore the PDCCH for the BWP switching, the MAC entity continues the ongoing RA procedure on the active BWP.

In the following examples, a UE is used for representing a communication device in FIG. 1, to simplify the illustration of the examples.

Figure 3:
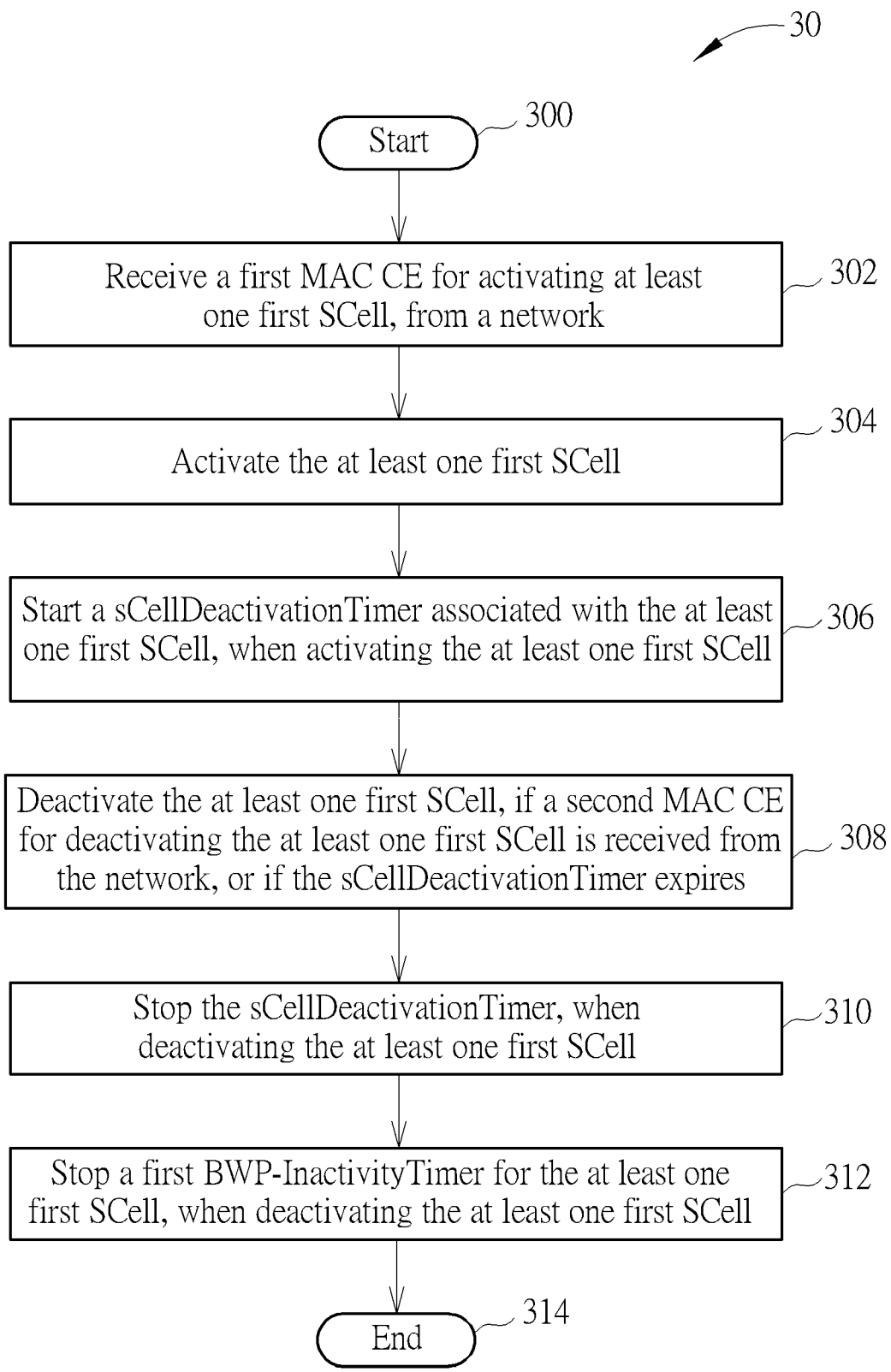
FIG. 3 is a flowchart of a process according to an example of the present invention.

A process 30 in FIG. 3 is utilized in a UE to handle BWPs, and includes the following steps:

Step 300: Start.
Step 302: Receive a first MAC control element (CE) (MAC CE) for activating at least one first secondary cell (SCell), from a network.
Step 304: Activate the at least one first SCell.
Step 306: Start a sCellDeactivationTimer associated with the at least one first SCell, when activating the at least one first SCell.
Step 308: Deactivate the at least one first SCell, if a second MAC CE for deactivating the at least one first SCell is received from the network, or if the sCellDeactivationTimer expires.
Step 310: Stop the sCellDeactivationTimer, when deactivating the at least one first SCell.
Step 312: Stop a first BWP-InactivityTimer for the at least one first SCell, when deactivating the at least one first SCell.
Step 314: End.

According to the process 30, the UE receives a first MAC CE for activating at least one first SCell, from a network. Then, the UE activates the at least one first SCell and starts a sCellDeactivationTimer associated with the at least one first SCell, when activating the at least one first SCell. If a second MAC CE for deactivating the at least one first SCell is received from the network, or if the sCellDeactivationTimer expires, the UE deactivates the at least one first SCell. When deactivating the at least one first SCell, the UE stops the sCellDeactivationTimer and a first BWP-InactivityTimer for the at least one first SCell. That is, as long as the at least one first SCell is deactivated, the first BWP-InactivityTimer is stopped accordingly. Thus, a BWP switching is not performed since the first BWP-InactivityTimer is stopped.

Realization of the process 30 is not limited to the above description. The following examples may be applied to the process 30.

In one example, the first BWP-InactivityTimer indicates a duration after the UE switching back to the default BWP. When the network releases the timer configuration, the UE stops the first BWP-InactivityTimer without switching to the default BWP.

In one example, when the at least one first SCell is activated, the UE performs operation(s) on the at least one first SCell. The operation(s) performed on the at least one first SCell include sounding reference signal (SRS) transmission(s), a channel quality indication (CQI)/a precoding matrix indicator (PMI)/a rank indicator (RI)/a channel-state-information (CSI) reference signal (CSI-RS) resource indicator (CRI) reporting for the at least one first SCell, a PDCCH monitoring and physical UL control channel (PUCCH) transmission(s).

In one example, the UE restarts the sCellDeactivationTimer, if a PDCCH on the at least one first SCell comprises an UL grant or a DL assignment.

In one example, when the at least one first SCell is deactivated, the UE does not perform the operations on the at least one first SCell described above.

In one example, if the active DL BWP is not the BWP indicated by a default-DL-BWP and a PDCCH indicating a DL assignment is received on the active BWP, the UE starts the BWP-InactivityTimer associated with the active DL BWP.

In one example, if a third MAC CE for activating at least one second SCell is received from the network, the UE activates the at least one second SCell. Then, the UE starts a second BWP-InactivityTimer for the at least one second SCell, when activating the at least one second SCell. That is, as long as the at least one second SCell is deactivated, the second BWP-InactivityTimer is started accordingly. Thus, the BWP switching is performed since the second BWP-InactivityTimer is started.

In one example, the UE stops the second BWP-InactivityTimer, if a RA procedure is initiated.

In one example, the UE performs a BWP switching for the at least one second SCell, if the second BWP-InactivityTimer expires.

Those skilled in the art should readily make combinations, modifications and/or alterations on the abovementioned description and examples. For example, the skilled person easily makes new embodiments of the network based on the embodiments and examples of the UE, and makes new embodiments of the UE based on the embodiments and examples of the network. The abovementioned description, steps and/or processes including suggested steps can be realized by means that could be hardware, software, firmware (known as a combination of a hardware device and computer instructions and data that reside as read-only software on the hardware device), an electronic system, or combination thereof. An example of the means may be the communication device 20. Any of the above processes and examples above may be compiled into the program codes 214.

To sum up, the present invention provides a method and a communication device for handling BWPs. When the SCell is deactivated, the UE stops the BWP-InactivityTimer to prevent the BWP switching from being performed. Thus, the problem in the art is solved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A communication device for handling bandwidth parts (BWPs), comprising:
   at least one storage device; and
   at least one processing circuit, coupled to the at least one storage device, wherein the at least one storage device stores, and the at least one processing circuit is configured to execute instructions of:
   receiving a first medium access control (MAC) control element (CE) (MAC CE) for activating at least one first secondary cell (SCell), from a network;
   activating the at least one first SCell;
   starting a sCellDeactivationTimer associated with the at least one first SCell, when activating the at least one first SCell;

performing a first BWP switching activating a BWP in response to receiving a PDCCH (Physical Downlink Control Channel) signal;

deactivating the at least one first SCell, if a second MAC CE for deactivating the at least one first SCell is received from the network, or if the sCellDeactivationTimer expires;

stopping the sCellDeactivationTimer, when deactivating the at least one first SCell;

stopping a first BWP-InactivityTimer, before the first BWP-inactivityTimer expires, for the at least one first SCell in order to avoid performing a second BWP switching back to a default BWP, when deactivating the at least one first SCell;

activating at least one second SCell, if a third MAC CE for activating the at least one second SCell is received from the network;

starting a second BWP-InactivityTimer for the at least one second SCell within a time period of performing the first BWP switching, when activating the at least one second SCell; and stopping the second BWP-InactivityTimer, when a random access (RA) procedure is initiated.

2. The communication device of claim 1, wherein the instructions further comprise: restarting the sCellDeactivationTimer, if a physical downlink (DL) control channel (PDCCH) on the at least one first SCell comprises an uplink (UL) grant or a DL assignment.

3. The communication device of claim 1, wherein the instructions further comprise: performing the second BWP switching for the at least one second SCell, if the second BWP-InactivityTimer expires.

4. A method of handling bandwidth parts (BWPs) utilized in a communication device, the method comprising:

receiving a first medium access control (MAC) control element (CE) (MAC CE) for activating at least one first secondary cell (SCell), from a network;

activating the at least one first SCell;

starting a sCellDeactivationTimer associated with the at least one first SCell, when activating the at least one first SCell;

performing a first BWP switching activating a BWP in response to receiving a PDCCH (Physical Downlink Control Channel) signal;

deactivating the at least one first SCell, if a second MAC CE for deactivating the at least one first SCell is received from the network, or if the sCellDeactivationTimer expires;

stopping the sCellDeactivationTimer, when deactivating the at least one first SCell;

stopping a first BWP-InactivityTimer, before the first BWP-inactivityTimer expires, for the at least one first SCell in order to avoid performing a second BWP switching back to a default BWP, when deactivating the at least one first SCell; activating at least one second SCell, if a third MAC CE for activating the at least one second SCell is received from the network;

starting a second BWP-InactivityTimer for the at least one second SCell within a time period of performing the first BWP switching, when activating the at least one second SCell; and stopping the second BWP-InactivityTimer, when a random access (RA) procedure is initiated.

5. The method of claim 4, wherein the method further comprises: restarting the sCellDeactivationTimer, if a physical downlink (DL) control channel (PDCCH) on the at least one first SCell comprises an uplink (UL) grant or a DL assignment.

6. The method of claim 4, wherein the method further comprises: performing the second BWP switching for the at least one second SCell, if the second BWP-InactivityTimer expires.

* * * * *